US012791784B2

(12) United States Patent
Kato et al.

(10) Patent No.: US 12,791,784 B2
(45) Date of Patent: Nov. 10, 2026

(54) CHIRPED OPTICAL MODULATOR

(71) Applicant: Marvell Asia Pte Ltd, Singapore (SG)

(72) Inventors: Masaki Kato, Palo Alto, CA (US); Gary Mak, Santa Clara, CA (US); Samira Karimelahi, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 220 days.

(21) Appl. No.: 18/143,743

(22) Filed: May 5, 2023

(65) Prior Publication Data

US 2023/0358953 A1 Nov. 9, 2023

Related U.S. Application Data

(60) Provisional application No. 63/339,564, filed on May 9, 2022.

(51) Int. Cl.
*G02B 6/293* (2006.01)
*G02B 6/12* (2006.01)
*G02B 6/122* (2006.01)

(52) U.S. Cl.
CPC ....... *G02B 6/12007* (2013.01); *G02B 6/1225* (2013.01); *G02B 6/29392* (2013.01); *G02B 6/29395* (2013.01); *G02B 2006/12142* (2013.01); *G02B 2006/1215* (2013.01); *G02B 6/2938* (2013.01)

(58) Field of Classification Search
None
See application file for complete search history.

(56) References Cited

U.S. PATENT DOCUMENTS 5,524,076 A * 6/1996 Rolland ................. B82Y 20/00 385/2
6,650,458 B1 * 11/2003 Prosyk .................... G02F 1/225 385/9
2009/0003841 A1 * 1/2009 Ghidini ................. G02F 1/2257 398/186
2011/0007995 A1 * 1/2011 Granestrand ........... G02F 1/225 385/3
2011/0135242 A1 * 6/2011 Prosyk .................... G02F 1/225 385/3

(Continued)

OTHER PUBLICATIONS

Extended European Search Report for European Patent Application No. 23172285.1, mailed Oct. 2, 2023. (9 pages).

*Primary Examiner* — Chad H Smith

(57) ABSTRACT

An optical modulator includes a photonic substrate a first modulator arm disposed on the photonic substrate. The first modulator arm is configured to modulate a first optical signal portion of an input optical signal at a first signal level. The optical modulator further includes a second modulator arm disposed on the photonic substrate. The second modulator arm is configured to modulate a second optical signal portion of the input optical signal at a second signal level that is different from the first signal level. The optical modulator further includes an optical combiner configured combine the first optical signal portion at the first signal level and the second optical signal portion at the second signal level to impart a target chirp onto the recombined optical signal. The target chirp is based on a signal level difference between the first signal level and the second signal level.

18 Claims, 9 Drawing Sheets

(56) References Cited

U.S. PATENT DOCUMENTS

| | | | | |
|---|---|---|---|---|
| 2011/0170161 | A1* | 7/2011 | Gill | G02F 1/025<br>359/259 |
| 2020/0099454 | A1* | 3/2020 | Talkhooncheh | G02F 1/225 |

* cited by examiner

CHIRPED OPTICAL MODULATOR

PRIORITY

This application claims the benefit of U.S. provisional application entitled "CHIRPED MACH-ZEHNDER MODULATOR," filed May 9, 2022, and assigned Ser. No. 63/339,564, the entire disclosure of which is hereby expressly incorporated by reference.

BACKGROUND

Technical Field

The disclosure relates generally to optical modulators, and more particularly to semiconductor-based optical modulators.

Brief Description of Related Technology

During this time of growth of Internet technologies and usage, demand for high speed data transmission has increased rapidly. As an example, average internet traffic in 2022 was estimated to exceed 900 terabits per second. Technologies to support such sustained usage levels will continue to proliferate. Optical transmission of data can support vast amounts using multiple channels. Nevertheless, transmission conditions are often wavelength dependent and result in differing signal loss performance among different channels with different center wavelengths when transported over the same fiber length. Decreasing channel-to-channel optical signal performance variance will reduce signal loss in multiple-channel optical systems. Accordingly, such improvements to channel-to-channel performance consistency will aid in meeting the growing world demand for telecommunication bandwidth by allowing more channels to be transported over a single fiber with reduced signal loss.

SUMMARY

Figure 1:
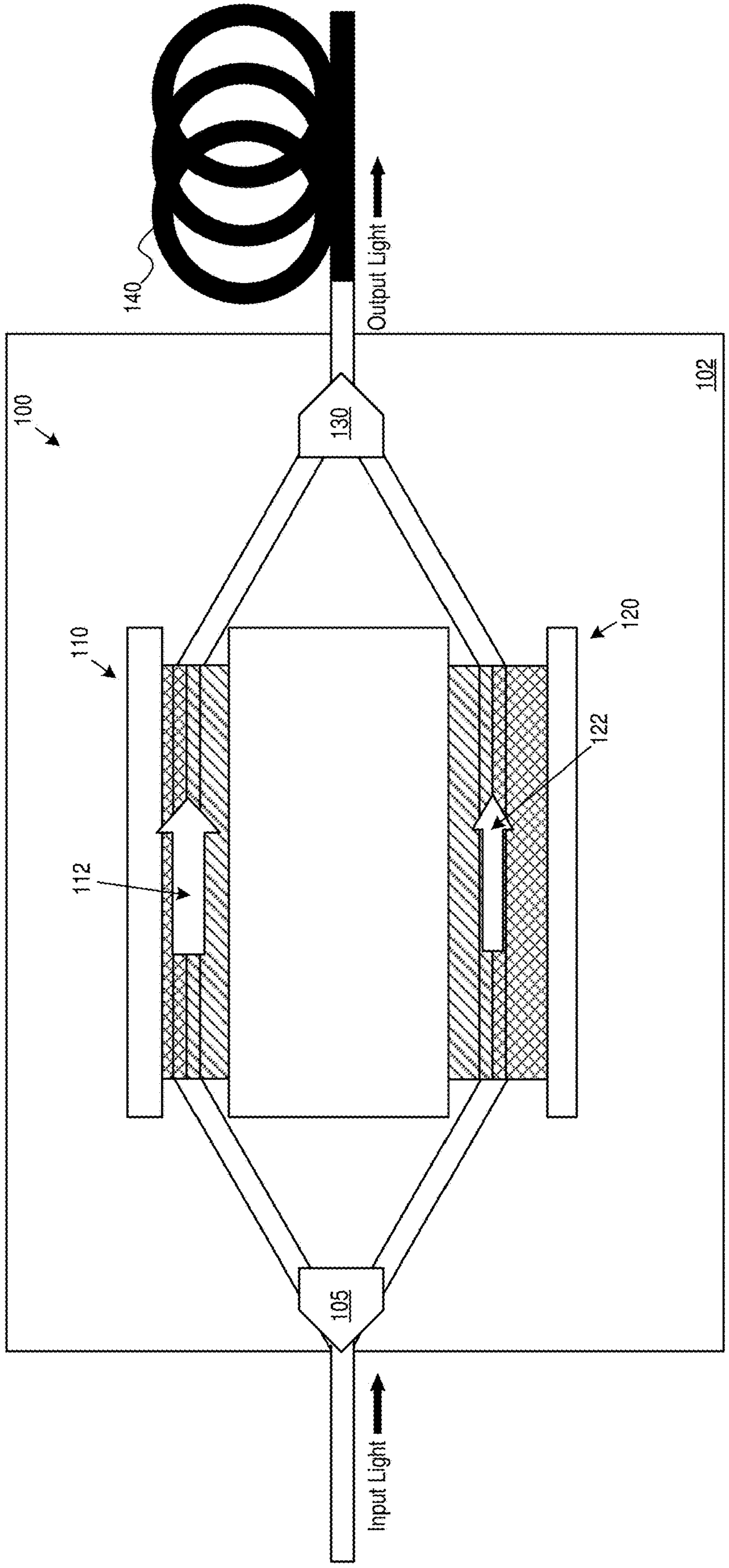
FIG. 1 shows an example chirped optical modulator in accordance with various implementations of the present disclosure.

In an implementation, an optical modulator includes: a photonic substrate; a first modulator arm disposed on the photonic substrate, the first modulator arm configured to modulate a first optical signal portion of an input optical signal at a first signal level; a second modulator arm disposed on the photonic substrate, the second modulator arm configured to modulate a second optical signal portion of the input optical signal at a second signal level that is different from the first signal level; and an optical combiner configured combine the first optical signal portion at the first signal level and the second optical signal portion at the second signal level to and impart a target chirp onto the recombined optical signal, the target chirp being based on a signal level difference between the first signal level and the second signal level.

In an implementation, a method of optical modulation includes: splitting, via an optical splitter disposed on a photonic substrate, an inpu optical signal into a first optical signal portion and a second optical signal portion; modulating, via a first modulator arm disposed on the photonic substrate, the first optical signal portion of the input optical signal at a first signal level; modulating, via a second modulator arm disposed on the photonic substrate, the second optical signal portion of the input optical signal at a second signal level that is the first signal level; and combining, via an optical combiner disposed on the photonic substrate, the first optical signal portion at the first signal level and the second optical signal portion at the second signal level to impart a target chirp onto the recombined optical signal, the target chirp being based on a signal level difference between the first signal level and the second signal level.

In an implementation, a method of manufacturing includes: providing a photonic substrate; fabricating a first modulator arm on the photonic substrate, the first modulator arm configured to modulate a first optical signal portion of an input optical signal at a first signal level; fabricating a second modulator arm on the photonic substrate, the second modulator arm configured to modulate a second optical signal portion of the input optical signal at a second signal level characterized by a signal level difference from the first signal level; and fabricating an optical combiner configured combine the first optical signal portion at the first signal level and the second optical signal portion at the second signal level to impart a target chirp onto the recombined optical signal based on the signal level difference between the first signal level and the second signal level.

DETAILED DESCRIPTION

In various contexts, optical modulators encode electromagnetic modulation signals onto light signals. In some cases, one or more radio-frequency (RF) signals, e.g., potentially aggregated from multiple sources, provide the to-be encoded modulation signals. An optical modulator receives the RF signals and unencoded light as inputs and produces light with the RF signal encoded thereon as an output. An example of a type of an optical modulator is an optical modulator that splits light from a coherent source in two portions, selectively phase shifts at least one of the portions by a desired phase shift in accordance with the RF signal to be encoded, and then recombines the portions to create an interference effect that encodes the RF signal into the intensity profile of the output light. An example is a Mach-Zehnder modulator (MZM) that splits input light into two arms and then recombines the light after phase shifting light passing through (at least) one of the arms.

In various example semiconductor-based systems, the phase shift is imparted by passing light through an optical waveguide coincident with a P-N junction that extends along the optical path of the optical waveguide. The RF signal is electrically coupled across the P-N junction, e.g., from an input contact to a DC reference point, to impart the phase shift on the passing light. In some cases, modulation bandwidth of such systems is up to 1-300 gigahertz or higher.

In some cases, for example in communication systems using long lengths of optical fiber, high bandwidth signals (up to 1-300 gigahertz or higher) undergo dispersion. Dispersion, resulting from different frequency components of the high bandwidth signal traveling at different speeds, causes the shortest time-scale features of the high bandwidth signal (such as rising and falling edges, peaks, and/or other time-dependent features) to spread out in time. As an illustrative example, a pulse within the signal is spread out in time. Accordingly, physically encoded "0"s and "1"s (or other symbols) in a data signal spread out and overlap in time. As a result, the encoded "0"s and "1"s become less distinguishable from neighboring "0"s and "1"s. Effectively, the signal power is reduced. In some cases, this is referred to as the "power penalty" due to dispersion or a dispersion power penalty (DPP). For various example optical systems without dispersion mitigation, the zero-dispersion wavelength of the optical fiber has the lowest DDP for unchirped pulses. Thus, the zero-dispersion wavelength is at a 'DPP valley'. As the center wavelength of an example unchirped optical signal diverges from the zero-dispersion wavelength of the optical fiber, the DPP increases. Because the dispersion varies with wavelength, the DPP changes with wavelength and contributes an effective wavelength-dependent power loss.

Spreading an optical signal out over time according to the frequency components in a signal is referred to as chirp. Therefore, dispersion from an optical fiber chirps an optical signal. When higher frequency components of the optical signal are advanced in time relative to lower frequency components, the chirp is positive. When lower frequency components are advanced in time relative to higher frequency components, the chirp is negative. To mitigate the chirp imparted by the optical fiber (or chirp from any other source), a chirp of opposite sign is applied. If the mitigating chirp is also equal in magnitude (while opposite in sign), the chirp from the optical fiber is entirely cancelled.

Now referring to FIG. 1, FIG. 1 shows an example chirped optical modulator 100. The example chirped optical modulator 100 includes a photonic substrate 102. In an example, the nanophotonic substrate includes a complementary metal oxide on semiconductor (CMOS) compatible substrate, such as II-VI substrate, III-V substrate, or other nanofabrication compatible substrate. An optical splitter 105, splits an input optical signal into a first portion and a second portion. A first modulator arm 110 of the chirped optical modulator 100 is disposed on the photonic substrate 102. The first modulator arm 110 is configured to modulate a first portion 112 of the optical signal traveling through the modulator. A second modulator arm 120 of the chirped optical modulator 100 is disposed on the photonic substrate 102. The second modulator arm 120 is configured to modulate a second portion 122 of the optical signal traveling through the modulator.

The first modulator arm 110 is configured to modulate the first portion 112 of the optical signal at a first signal level. The first signal level is a power level, modulation phase shift level, and/or other signal level that characterizes an amount of optical signal present being generated on the first modulation arm 110.

The second modulator arm 120 is configured to modulate the second portion 122 of the optical signal at a second signal level. The second signal level is a power level, modulation phase shift level, and/or other signal level that characterizes an amount of optical signal being generated on the second modulation arm 120. The second signal level is different from the first signal level, in an embodiment. Thus, the operation of the modulation arms 110, 120 is asymmetric due to this signal level difference between the arms.

The example chirped optical modulator 100 further includes an optical combiner 130. The optical combiner 130 combines the first portion of the optical signal 112 and the second portion of the optical signal 122 in accordance with the first signal level and the second signal level. In other words, the optical combiner is configured to recombine the signal portions 112, 122 in a manner that preserves the signal level difference. Thus, in the recombined optical signal, the contributions from the modulation arms 110, 120 are different. The different contributions of the respective signal levels of the first signal portion and second signal portions impart a chirp. Because the respective signals impart differing magnitude time-dependent phase contributions. Note, the phase modulation imparted by the phase modulators of the respective arms provides the time-dependent phase component. In a conventional modulator, these time-dependent phase components from the balanced signals in the two arms are equal and opposite. These equal and opposite contributions result only in intensity modulation once combined. Thus, rather than cancelling one another, the different magnitude time-dependent phase components from the first signal portion and second signal portion produce a resultant time-dependent phase contribution from the stronger two signal portions. The time-dependent phase contribution provides a chirp on the output. By controlling the signal level difference between the modulation arms 110, 120, a target chirp is obtained for the recombined optical signal at the output of the example chirped optical modulator 100. The target chirp is selected to mitigate the dispersion from the optical fiber 140 output-coupled to the example chirped optical modulator 100.

In a conventional optical modulator, the two different modulation arms of the conventional optical modulator are configured to balance their signal levels. This allows the conventional modulator to produce the shortest timescale features that the conventional modulator's components will allow. As discussed above, the example chirped optical modulator 100 operates with a signal level difference between the modulation arms 110, 120. Thus, the output of the example chirped optical modulator 100 is chirped. As discussed above, the chirp spreads the modulated features (such as, rising edges, falling edges, pulse widths, or other modulated features) from the chirped optical modulator 100 out in time. Thus, if the example chirped optical modulator 100 were reconfigured to operate in a conventional manner, the example chirped optical modulator 100 would be able to produce shorter time scale features with less distortion. Counterintuitively, the example chirped optical modulator 100 operates in a manner that reduces the quality of the immediate output of the example chirped optical modulator 100 to produce a chirped output. This chirped output has the previously unrecognized advantage of being able to mitigate dispersion effects of optical fiber transport.

Figure 2:
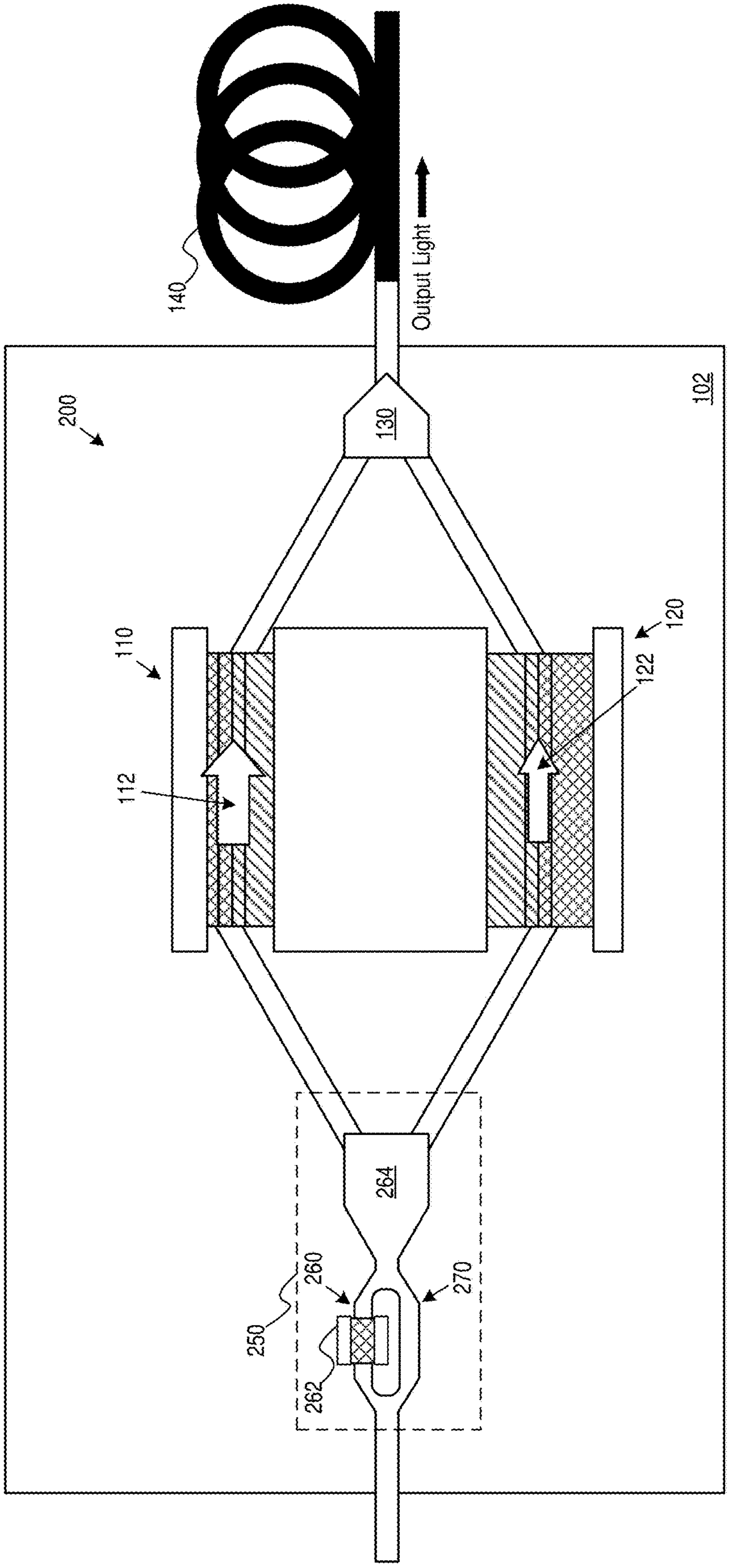
FIG. 2 shows an example asymmetric splitter based chirped optical modulator implementation in accordance with the chirped optical modulator of FIG. 1.

Referring now to FIG. 2, an example asymmetric splitter based (ASB) chirped optical modulator 200 is seen. The example ASB chirped optical modulator 200 includes an asymmetric optical splitter 250. The asymmetric optical splitter 250 splits the input optical signal unevenly between the two modulator arms 110, 120. The asymmetric split creates (at least a portion of) the signal level difference between the two modulator arms 110, 120.

The example asymmetric optical splitter 250 is structured to produce a variable split ratio. The example asymmetric optical splitter 250 includes two splitter arms 260, 270. A first splitter arm includes a phase modulator 262 that phase-shifts the portion of the optical signal on the first arm. The second arm 270 contributes a portion of the optical signal without a phase shift. The phase modulator 262 is used with a phase-division multiplexer 264 to control the amount of optical signal sent to the respective modulator arms 110, 120. The controlling the level of phase-shift by the phase modulator 262 controls how the signal will be split among the outputs of the phase-division multiplexer 264 according the decomposition of the input phase into the output phase components of the phase-division multiplexer 264. Thus, changing the phase shift applied by the phase modulator 262 will change the input phase angle and, as a result, the split ratio produced by the phase-division multiplexer 264. Controlling the split ratio controls the relative power levels of the optical signals on the respective modulator arms 110, 120. Because the signal level difference controls the magnitude and sign of the chirp, the magnitude and sign of the chirp is controlled by controlling the phase modulator 262.

In various implementations, the variable optical splitter 260 is configured by an operator to tune the split ratio to generate a target chirp that corresponds to a particular fiber length and/or fiber type of the transport fiber 140 used with the optical modulator 200. In some implementations, feedback circuitry (not show) automatically tunes the variable optical splitter to reduce noise at the end of the transport fiber 140 via a feedback signal.

Although not shown, ASB chirped optical modulators use fixed asymmetric split ratio optical splitters in various implementations.

Figure 3:
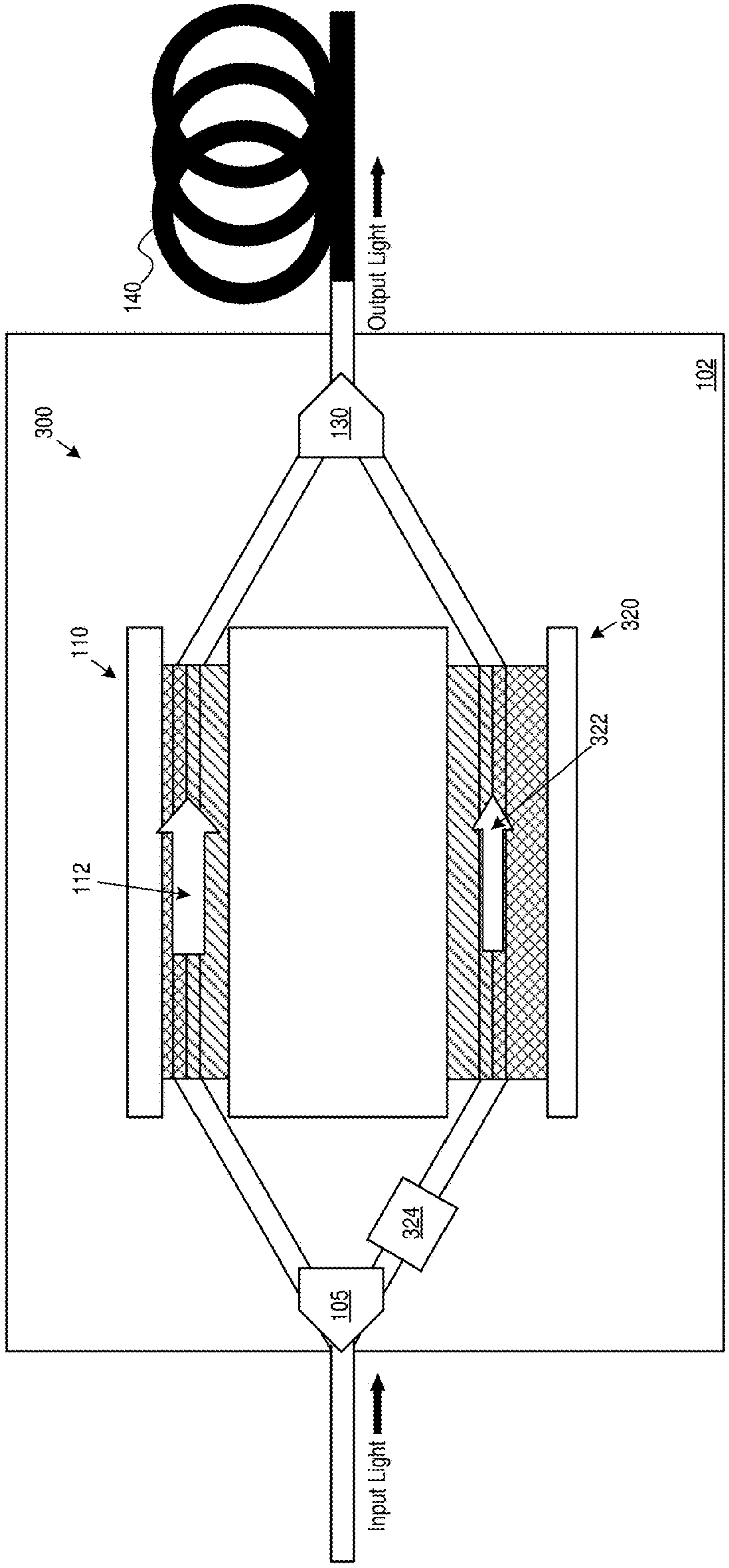
FIG. 3 shows an example attenuation based chirped optical modulator implementation in accordance with the chirped optical modulator of FIG. 1.

Referring now to FIG. 3, an example attenuation based chirped optical modulator 300 is shown. The example attenuation based chirped optical modulator 300 includes an optical attenuator 324 on the second modulator arm 320. The attenuation provided by the optical attenuator 324 creates a signal level difference between the first modulator arm 110 and the second modulator arm 320 because the optical attenuator 324 reduces the power level of the second portion of the optical signal 322 relative to the first portion of the optical signal 112.

Figure 4:
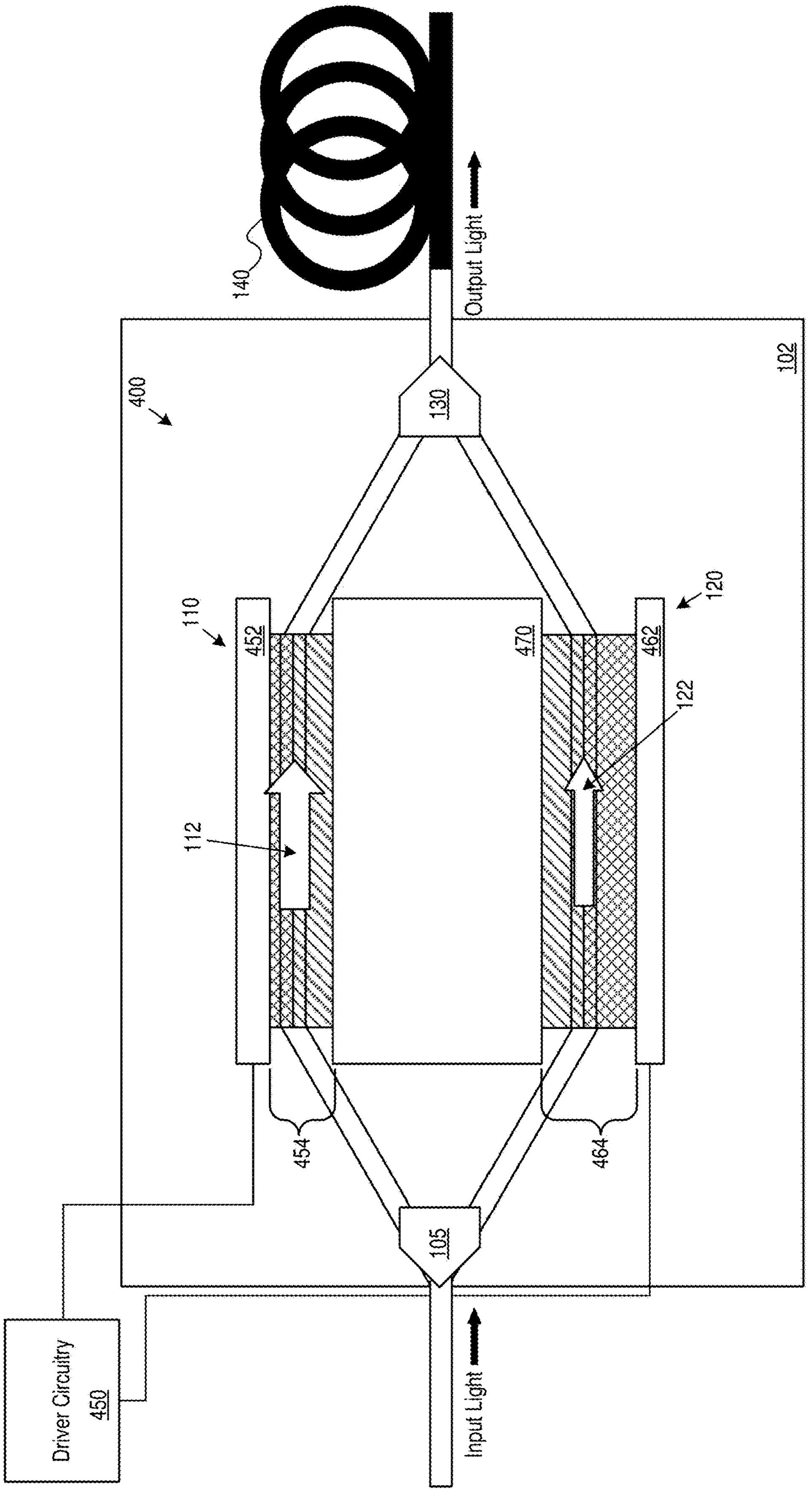
FIG. 4 shows an example modulation depth chirped optical modulator implementation in accordance with the chirped optical modulator of FIG. 1.

Referring now to FIG. 4, an example modulation depth chirped optical modulator 400 is shown. The driver circuitry 450 is configured to drive electrical signal contacts 452, 462. When driven, the electrical signal contacts 452, 462 produce respective electric fields across the respective modulator arms 110, 120 due to the potential difference between their driving voltages and the reference voltage of the ground contact 470. In other words, the first electrical signal contact 452 in conjunction with the ground contact 470 produces a driving electric field for the first modulator arm 110, and the second electrical signal contact 462 in conjunction with the ground contact 470 produces a driving electric field for the second modulator arm 120.

In some implementations, the driver circuitry 450 varies the first signal contact between Vmax and Vmin and varies the second signal contact between Vadj-max and Vadj-min. Where the difference between Vmax and Vmin is greater than the difference between Vadj-max and Vadj-min. Thus, the swing voltage level (e.g., the difference between the maximum and minimum modulation signal voltages) of the electrical domain radio-frequency driving signals for the first modulator arm 110 is greater than that of the second modulator arm 120. Because the modulation depth is less for the second modulator arm 120 the peak relative phase-shift imparted on the second portion of the optical signal 122 is smaller than the peak relative phase-shift imparted on the first portion of the optical signal 112. This difference in peak relative phase-shift creates the signal level difference between modulation in the first modulator arm 110 and modulation in the second modulator arm 120. When the first portion of the optical signal 112 and the second portion of the optical signal 122 recombined at optical combiner 130, the signal level difference (due to the difference in modulation depth) imparts the target chirp.

In the example modulation depth chirped optical modulator 400, the respective spacings 454, 464 between the electrical signal contacts 452, 462 and the ground contact 470 are different. The differing spacings contribute to differing electric field levels for the same voltages on the two electrical signal contacts 452, 462. The differing driving electric fields create different modulation depths which creates the signal level difference.

Figure 5:
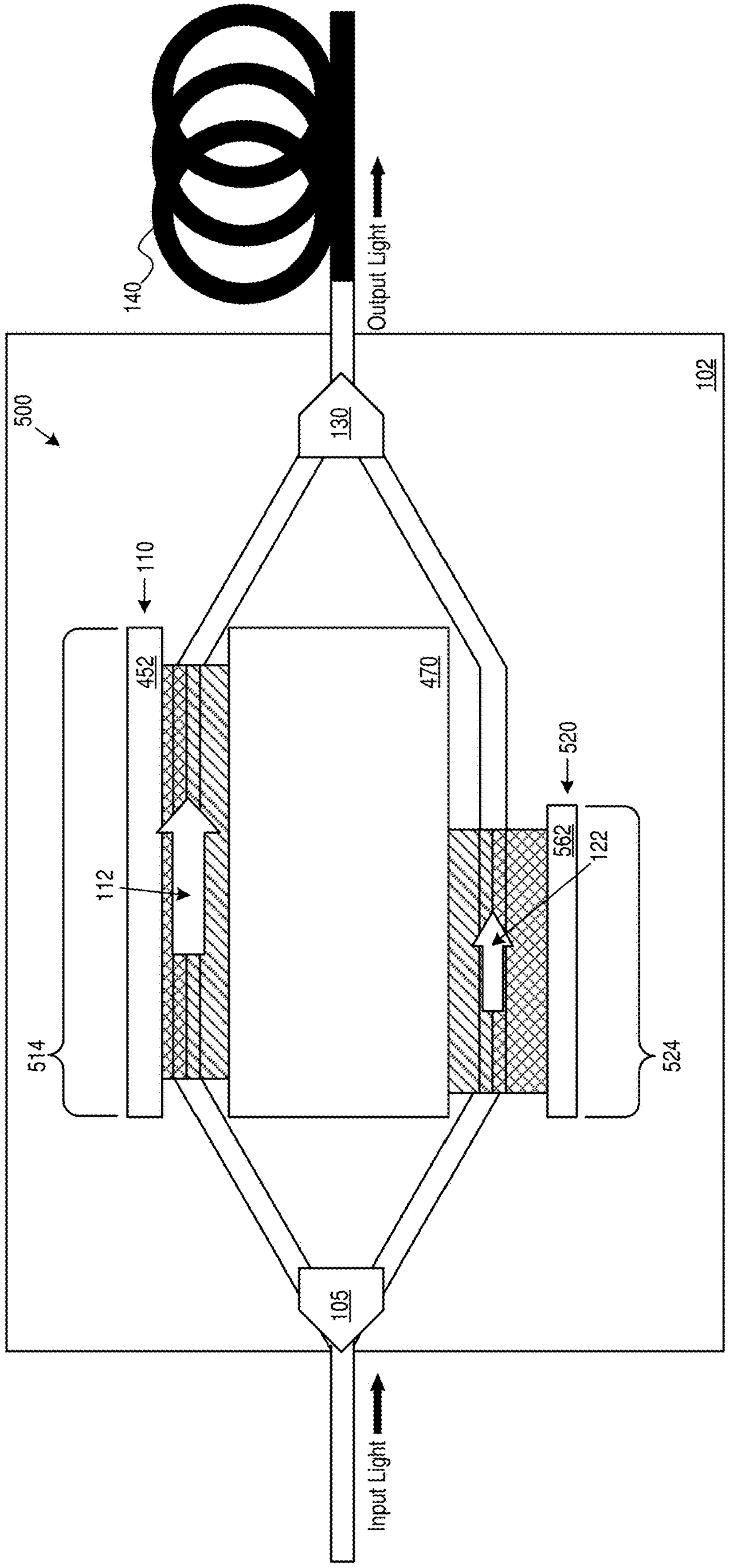
FIG. 5 shows a second example modulation depth chirped optical modulator implementation in accordance with the chirped optical modulator of FIG. 1.

Referring now to FIG. 5, a second example modulation depth chirped optical modulator 500 is shown. The first modulator arm 110 and the second modulator arm 520 include active modulator lengths 514, 524 over which active components, such as electrical signal contacts 452, 562 operate to apply modulation phase shifts to optical signals traversing the modulator arms 110, 520. The total effective phase shift applied by a modulator arm 110, 520 is achieved over the full active modulator length 514, 524 of the modulator arm 110, 520. In the second example modulation depth chirped optical modulator 500, the active modulation length of the first modulator arm 110 is different than the active modulation length of the second modulator arm 520. Thus, the modulation depth achieved over the differing active modulation lengths 514, 524 is different when other structural and operation characteristics of the first modulator arm 110 and second modulator arm 520 are the same. The difference in modulation depth results in the modulation signal level difference between the modulator arms 110, 520.

Figure 6:
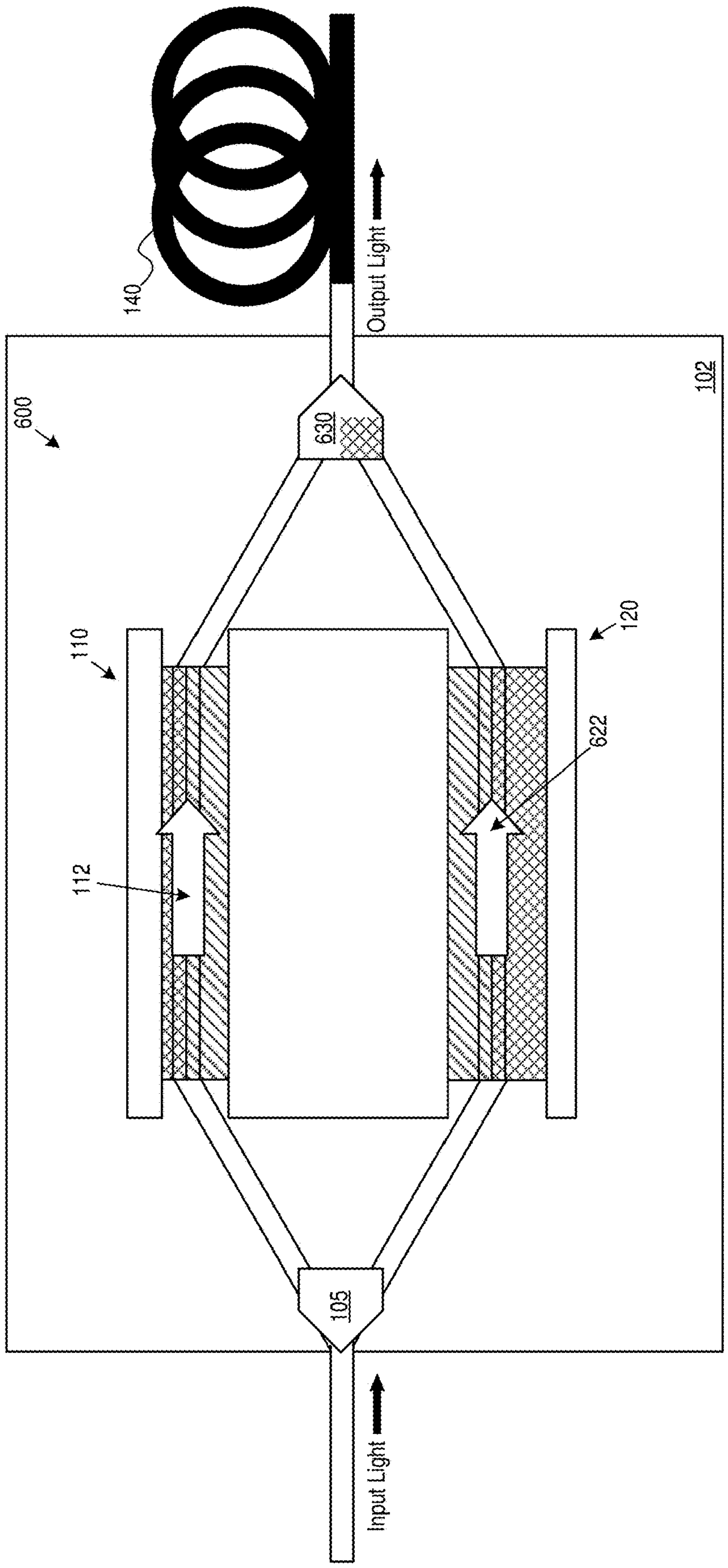
FIG. 6 shows an example asymmetric combiner based chirped optical modulator implementation in accordance with the chirped optical modulator of FIG. 1.

Referring now to FIG. 6, an example asymmetric combiner based (ACB) chirped optical modulator 600 is shown. The example ACB chirped optical modulator 600 is similar to ASB chirped optical modulator 200 and the attenuation based chirped optical modulator 300 in that the ACB chirped optical modulator 600 also relies on creating differ power level contributions from the different modulator arms 110, 120. In the example ACB chirped optical modulator 600, the signal level difference arises from the asymmetric optical combiner 630 rather than differences in the modulator arms 110, 120. Rather than taking equal power contributions from the modulator arms 110, 120, the asymmetric optical combiner 630 takes a different power contribution from each of the modulator arms 110, 120. This creates a power level difference between the contributions from the modulator arms 110, 120, which causes the signal level difference. This signal level difference is created in implementations including those where the signal levels 112, 622 in the modulator arms (before asymmetric combination) are equal.

In various implementations, the techniques and architectures for creating the signals level differences in the implementations discussed above are combined. For example, an asymmetric splitter is used in combination with different driving voltages on the different arms. Thus, the signal level difference results both from a power level difference and a modulation depth difference. In an example, attenuation of one of the modulator arms is used with asymmetric splitting.

Thus, the total power level difference achieved in the modulator arms is achieved in part through asymmetric splitting and in part through attenuation. The use of both asymmetric splitting and attenuation allows for a given power level difference to be created without requiring a single operation or component to create the entire power level difference. In an example, an asymmetric and variable splitter is used in combination with fixed combiner and the same driving voltages on the different arms. In various implementations, other combinations of the discussed techniques and architectures are used.

Figure 7:
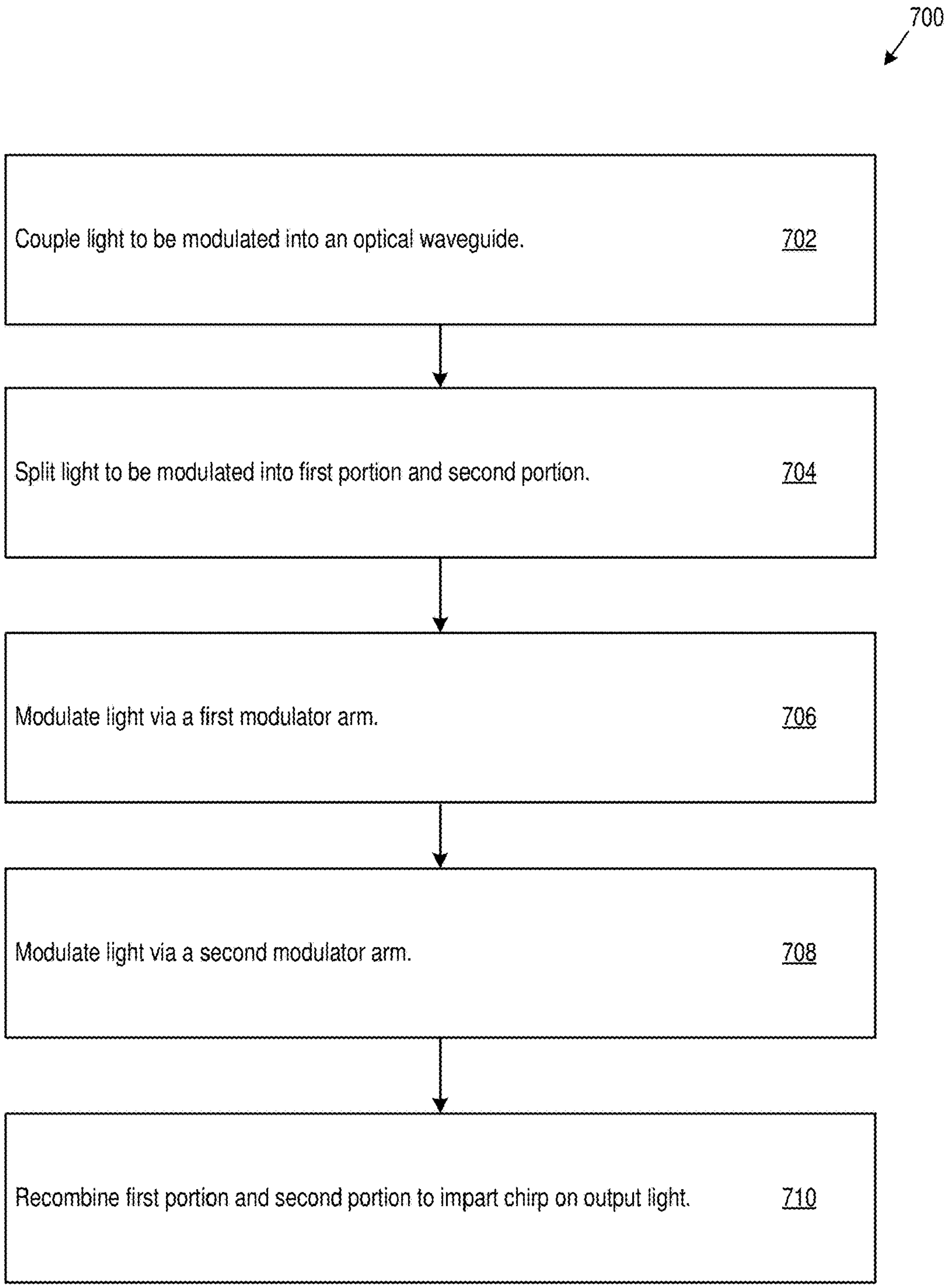
FIG. 7 shows an example method of operation for the example chirped optical modulators of FIGS. 1-6.

FIG. 7 shows an example method of operation 700 for an example chirped optical modulator. The method of operation 700 is implemented by any of the example optical modulators discussed above with reference to FIGS. 1-6, or another suitable chirped optical modulator.

Light to be modulated is optically coupled into an optical waveguide (702) on a photonic substrate. In various implementations, an illumination source, such as a continuous wave laser tuned to a communication band or coherent illumination source, provides the light to be modulated. The light to be modulated is split into a first portion and a second portion (704). An optical splitter disposed on the photonic substrate is coupled to the optical waveguide to split the light into the portions for the two modulator arms.

The first portion of the light to be modulated is then modulated, via the first modulator arm disposed on the photonic substrate (706). The modulation of the first portion is performed (or at least output from the first modulator arm) at a first signal level. Concurrently, the second portion of the light to be modulated is modulated, via the second modulator arm disposed on the photonic substrate (708) The modulation of the second portion is performed (or at least output from the second modulator arm) at a second signal level that is different from the first signal level. Thus, there is a signal level difference between the first portion and the second portion.

In various implementations, modulating the light at the at a particular signal level includes implementing an asymmetric split ratio between the first portion and the second portion, creating a modulation depth difference between the first portion and the second portion, applying attenuation to the first portion and/or the second portion, applying asymmetric recombination to the first portion and the second portion, and/or otherwise creating a power level difference or modulation depth difference between the first portion and the second portion.

The first portion and second portion of the light are recombined, via an optical combiner, after modulation (710). The recombination of the first portion and second portion preserves (or, where asymmetric recombination is used, at least in part creates) the signal level difference between the first portion and the second portion. The recombination of the first portion and second portion imparts a target chirp on the modulated output optical signal due to the signal level difference between the first portion and the second portion.

Figure 8:
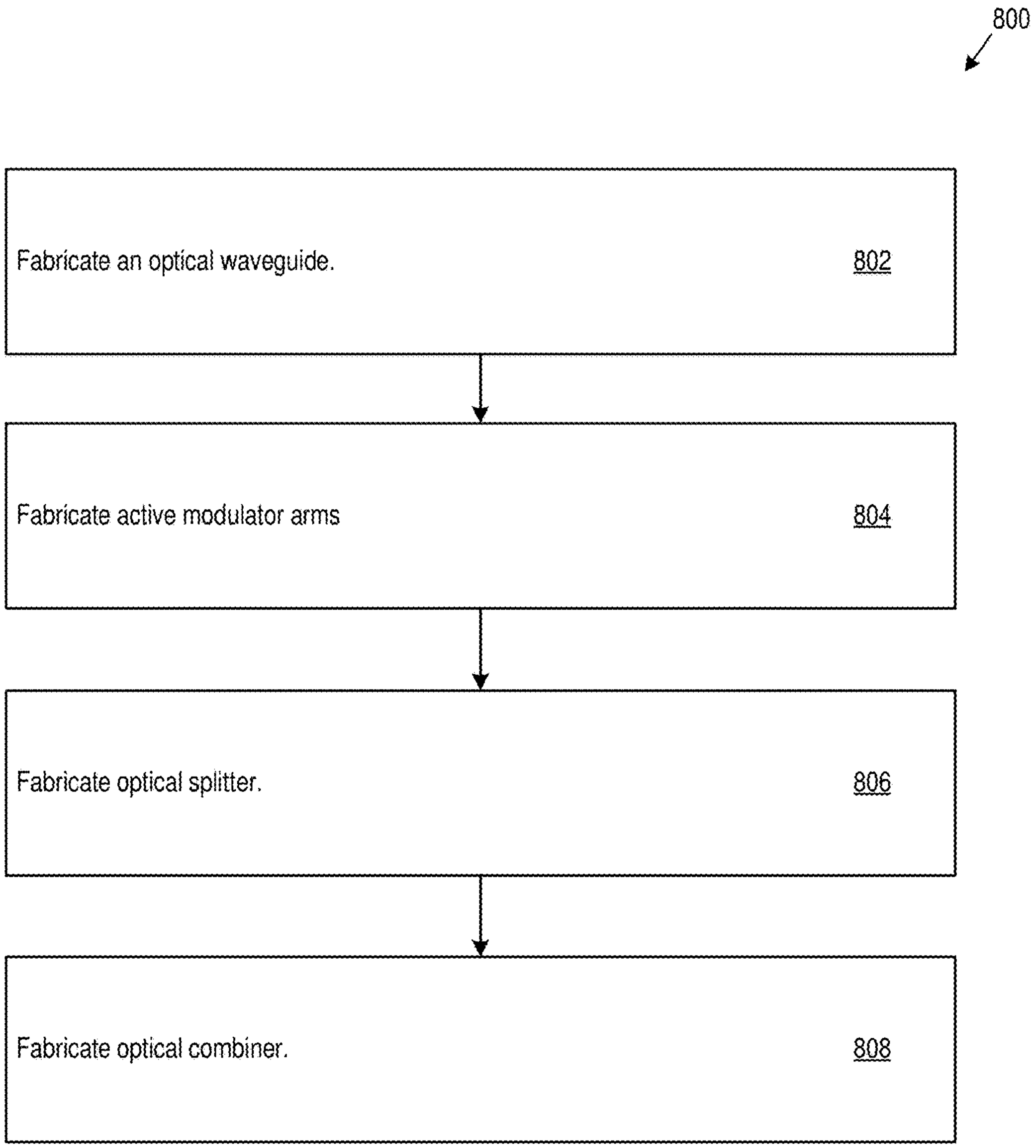
FIG. 8 shows an example method of manufacture for the example chirped optical modulators of FIGS. 1-6.

FIG. 8 shows an example method of manufacture 800 for an example chirped optical modulator. The method of manufacture 800 is implemented to manufacture any of the example optical modulators discussed above with reference to FIGS. 1-6, or another chirped optical modulator. In other examples, any of the example chirped optical modulators discussed above with reference to FIGS. 1-6 are manufactured according to another suitable method of manufacture different than the method of manufacture 800.

An optical waveguide is fabricated on a photonic substrate (802), such as a silicon photonic substrate. In various implementations, the optical waveguide includes a region of high refractive index surrounded by lower refractive index material. For example, the waveguide includes a raised channel or ridge of comparatively higher optical-domain refractive index material (such as silicon, doped silicon, or other comparatively higher optical-domain refractive index material) surrounded on one or more sides by a material of comparatively lower optical-domain refractive index material (e.g., such as air, silicon dioxide, or other comparatively lower optical-domain refractive index material).

Active modulator arms are fabricated on the photonic substrate (804). The active modulator arms include electrical contacts that are used to apply electrical-domain modulation diving signals. The active modulator arms include P-N junctions within optical waveguide portions of the arms to produce phase-shifts in response to the electric fields created by the driving electrical-domain modulation diving signals. In various implementations, the fabrication of the P-N junction includes fabrication of P-doped portion and N-doped portion on the substrate with P-N junctions defining the borders between the P-doped portion and the N-doped portion. In some implementations, the modulator arms are the same length. In some modulation depth based chirped optical modulator implementations, the modulator arms are different lengths. In some implementations, an attenuator is fabricated on one of the arms. In various implementations, an attenuator includes a structure configured to frustrate or otherwise reduce waveguiding in the optical waveguide. For example, a taper within the waveguide, a reduction of index contrast with surrounding material, and/or other reduction in waveguiding provides attenuation to the optical signal. In various implementations, other attenuation structures are used.

In some cases, the P-doped portions and the N-doped portions are fabricated prior to fabrication of the waveguide. For example, in some cases, the P-doped portion and the N-doped portion are fabricated by applying a mask, diffusing a first one of the P-dopants and the N-dopants into the masked substrate, removing the mask and applying a compliment mask, and diffusing the other of the P-dopants and the N-dopants into the complimentarily masked substrate, removing the compliment mask, applying a mask over the optical waveguide, and etching the substrate around the waveguide to form a raised ridge. However, other implementations use other suitable fabrication techniques. For example, in some cases, either or both of the P-dopants and the N-dopants are diffused in multiple cycles of masking and diffusion to create sub-portions with differing dopant levels.

In various implementations, metal contacts are added to support application of the modulation signal for travelling wave operation, in which the modulation signal is allowed to propagate along an extended length of the signal contact. In some cases, the metal contacts and lines are applied in multiple layers. For example, in some cases, vias are formed to provide electrical contact to the optical waveguide in a first layer of the substrate. The first layer of the substrate is then covered in an intermediate layer (such as an oxide layer). The vias extend through the intermediate layer to connect with metal contacts fabricated on top of the intermediate layer. Thus, the signal contact and first ground line are electrically coupled to the optical waveguide using one or more vias in various implementations.

An optical splitter is fabricated on the photonic substrate (806). In some implementations, the splitter is a fixed-ratio splitter that splits the optical signal (e.g., the light to be modulated) into a particular ratio that is not reconfigurable after manufacture. In some implementations, the splitter is a variable optical splitter. In the example discussed with regard to FIG. 2, the variable optical splitter includes a phase modulator and a phase-division multiplexer. The phase modulator includes an active modulator portion similar to the modulator arms discussed above. In various implementations, the phase modulator includes electrical contacts and/or P-N junctions to support control of the output phase of the phase modulator. Controlling the output phase of the phase modulator controls the ratio of the optical power that will be divided into the output channels of the phase-division multiplexer. Various other variable optical splitters use other splitting mechanisms. For example, a polarization-based split is used in some implementations.

An optical combiner is fabricated on the photonic substrate (808). In various implementations, the optical combiner includes a symmetric combiner that preserves a signal level difference generated in the modulator arms. In some implementations, an asymmetric combiner is used to (at least in part) cause the signal level difference between the contributions from the modulated portions from each arm.

Figure 9:
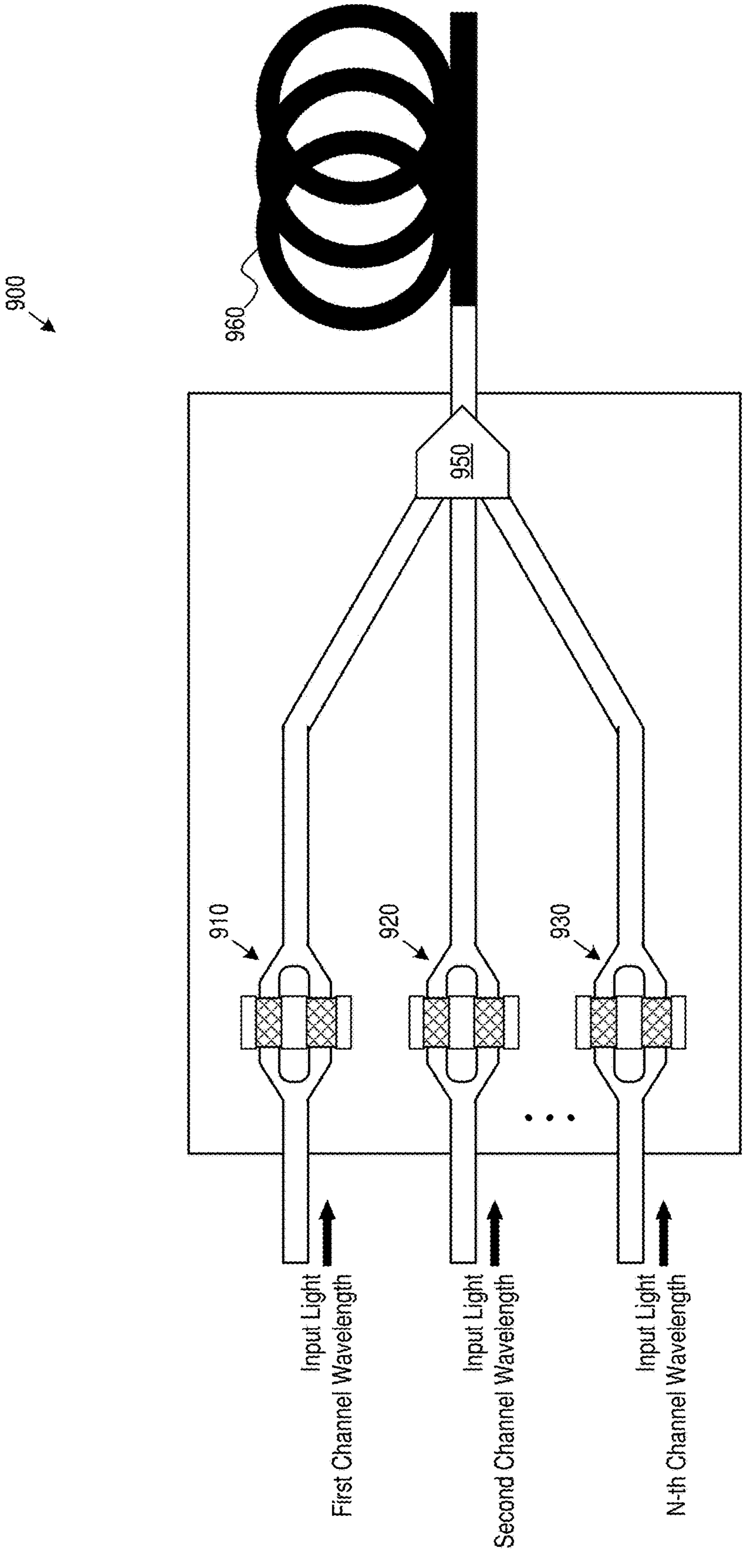
FIG. 9 shows an example multiple-channel optical communication system for use with the example chirped optical modulators of FIGS. 1-6.

Referring now to FIG. 9, an example multiple-channel optical communication system 900 is shown. In the example multiple-channel optical communication system 900, each optical channel has an associated chirped optical modulator 910, 920, 930 that generates a modulated data signal at an associated center wavelength for the channel. A wavelength-division multiplexer 950 multiplexes the optical channels onto a transport optical fiber 960. The fiber has a zero dispersion wavelength. Although not shown, various multiple-channel optical communication systems include an optical channel at the zero-dispersion wavelength of the transport optical fiber. Accordingly, such a channel includes a non-chirped optical modulator because the channel at the zero-dispersion wavelength will not incur the power penalty during transmission over the transport optical fiber 960. The chirped optical modulators 910, 920, 930 impart respective target chirps to their respective output optical signals. The respective target chirps shift the effective signal power loss minimum wavelength from the zero-dispersion wavelength of the fiber to the center wavelength of the corresponding channel, which mitigates and/or eliminates the power penalty incurred by signals on that channel.

Various example implementations have been included for illustration. Other implementations are possible.

Table 1 includes various examples.

TABLE 1

| Examples |
|---|
| E1. An optical modulator including:<br>a photonic substrate;<br>a first modulator arm disposed on the photonic substrate, the first modulator arm configured to modulate a first optical signal portion of an input optical signal at a first signal level;<br>a second modulator arm disposed on the photonic substrate, the second modulator arm configured to modulate a second optical signal portion of the input optical signal at a second signal level that is different from the first signal level; and<br>an optical combiner configured combine the first optical signal portion at the first signal level and the second optical signal portion at the second signal level to impart a target chirp onto the recombined optical signal, the target chirp being based on a signal level difference between the first signal level and the second signal level, where:<br>optionally, the optical modulator is in accord with any other example in this table. |
| E2. The optical modulator of any other example in this table, further including an optical splitter configured to split the input optical signal into the first optical signal portion and the second optical signal portion. |
| E3. The optical modulator of example E2 or any other example in this table, where the optical splitter is configured to split a power level of the optical signal asymmetrically to cause the signal level difference. |
| E4. The optical modulator of example E3 or any other example in this table, where the optical splitter includes a variable optical splitter configured to adjust the split of the power level in response to an operator input and/or a feedback signal. |
| E5. The optical modulator of example E4 or any other example in this table, where the variable optical splitter includes:<br>a first splitter arm including a phase modulator;<br>a second splitter arm; and<br>a phase-division multiplexer. |
| E6. The optical modulator of any other example in this table, where driver circuitry is configured to generate a swing voltage level difference between a first electrical-domain signal applied across the first modulator arm and a second electrical-domain signal applied across the second modulator arm to cause the signal level difference. |
| E7. The optical modulator of any other example in this table, where a first active modulator length of the first modulator arm is different than a second active modulator length of the second modulator arm to cause the signal level difference. |
| E8. The optical modulator of any other example in this table, where an optical attenuator is disposed on the first modulator arm or the second modulator arm to cause the signal level difference. |
| E9. The optical modulator of any other example in this table, where the optical combiner is configured to asymmetrically combine the first optical signal portion and the second optical signal portion to combine the first optical signal portion at the first signal level and the second optical signal portion at the second signal level to impart the target chirp. |
| E10. The optical modulator of any other example in this table, where the optical combiner is configured to symmetrically combine the first optical signal portion and the second optical signal portion to combine the first optical signal portion at the first signal level and the second optical signal portion at the second signal level to impart the target chirp. |

TABLE 1-continued

| Examples |
| --- |
| E11. The optical modulator of any other example in this table, where the signal level difference includes:<br>a power level difference; and/or<br>a modulation depth difference. |
| E12. The optical modulator of any other example in this table, where:<br>an output of the optical modulator is coupled to an optical fiber, the output having first wavelength within a dispersion power penalty (DPP) valley; and<br>a location of the DPP valley is dependent on the target chirp. |
| E13. The optical modulator of example E12 or any other example in this table, where the first wavelength is a wavelength that corresponds to a center wavelength for a first optical channel of a multiple-channel optical communication system including the optical fiber. |
| E14. The optical modulator of example E13 or any other example in this table, where:<br>an output of the optical modulator is coupled to the optical fiber via a multiple-channel wavelength division multiplexer of the multiple-channel optical communication system to couple the first optical channel on the optical fiber, wherein the optical fiber is configured to carry multiple optical channels of the multiple-channel optical communication system; and<br>each of the multiple optical channels is associated with a corresponding optical modulator configured to impart a corresponding chirp associated with a corresponding power loss minimum wavelength at a corresponding center wavelength for that optical channel. |
| E15. A method of optical modulation including:<br>splitting, via an optical splitter disposed on a photonic substrate, an inpu optical signal into a first optical signal portion and a second optical signal portion;<br>modulating, via a first modulator arm disposed on the photonic substrate, the first optical signal portion of the input optical signal at a first signal level;<br>modulating, via a second modulator arm disposed on the photonic substrate, the second optical signal portion of the input optical signal at a second signal level that is the first signal level; and<br>combining, via an optical combiner disposed on the photonic substrate, the first optical signal portion at the first signal level and the second optical signal portion at the second signal level to impart a target chirp onto the recombined optical signal, the target chirp being based on a signal level difference between the first signal level and the second signal level, where:<br>optionally, the method is in accord with any other example in this table. |
| E16. The method of optical modulation of any other example in this table, where combining the first optical signal portion at the first signal level and the second optical signal portion at the second signal level includes asymmetrically combining the first optical signal portion and the second optical signal portion to impart the target chirp. |
| E17. The method of optical modulation of any other example in this table, where combining the first optical signal portion at the first signal level and the second optical signal portion at the second signal level includes symmetrically combining the first optical signal portion and the second optical signal portion to impart the target chirp. |
| E18. The method of optical modulation of any other example in this table, where the signal level difference includes:<br>a power level difference; and/or<br>a modulation depth level difference. |
| E19. The method of optical modulation of any other example in this table, where:<br>imparting the target chirp includes shifting a dispersion power penalty valley of an optical fiber in accord with the target chirp. |
| E20. A method of manufacturing including:<br>providing a photonic substrate;<br>fabricating a first modulator arm on the photonic substrate, the first modulator arm configured to modulate a first optical signal portion of an input optical signal at a first signal level;<br>fabricating a second modulator arm on the photonic substrate, the second modulator arm configured to modulate a second optical signal portion of the input optical signal at a second signal level characterized by a signal level difference from the first signal level; and<br>fabricating an optical combiner configured combine the first optical signal portion at the first signal level and the second optical signal portion at the second signal level to impart a target chirp onto the recombined optical signal based on the signal level difference between the first signal level and the second signal level, where:<br>optionally, the method is in accord with any other example in this table. |
| E21. A method of optical modulation including implementing the optical modulator of any example in this table. |
| E22. A method of manufacture including fabricating the optical modulator of any example in this table. |

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only.

What is claimed is:

1. A multi-channel optical communication system including:
   - a photonic substrate;
   - a plurality of optical modulators configured to generate modulated optical signals at respective center wavelengths, each optical modulator configured to impart a corresponding chirp associated with a respective power loss minimum wavelength at the respective center wavelength, each optical modulator including
     - a variable optical splitter disposed on the photonic substrate, the variable optical splitter configured to split a respective input optical signal at a respective wavelength into a first optical signal portion at a first input signal level and a second optical signal portion at a second input signal level that is different from the first input signal level, the variable optical splitter having i) a first splitter arm ii) a second splitter arm, and iii) only one variable phase modulator, the first splitter arm including the variable phase modulator, wherein the variable phase modulator is configured to control the split of the respective input optical signal at the respective wavelength into the first optical signal portion at the first input signal level and the second optical signal portion at the second input signal level,
     - a first modulator arm disposed on the photonic substrate and coupled to the variable optical splitter to receive the first optical signal portion, the first modulator arm configured to modulate the first optical signal portion,
     - a second modulator arm disposed on the photonic substrate and coupled to the variable optical splitter to receive the second optical signal portion, the second modulator arm configured to modulate the second optical signal portion, and
     - an optical combiner configured to combine the first optical signal portion and the second optical signal portion to impart a respective target chirp onto a respective recombined optical signal, the target chirp being based on a signal level difference between a first output signal level of the first optical portion and a second output signal level of the second optical portion, wherein the signal level difference is determined at least in part by an imbalance of signal intensity between the first modulator arm and the second modulator arm, wherein the imbalance of signal intensity is controlled to cause the target chirp; and
   - a wavelength-division multiplexer configured to multiplex outputs of the plurality of optical modulators for transmission via an optical fiber, wherein the optical fiber is configured to carry multiple optical channels of the multi-channel optical communication system.

2. The multi-channel optical communication system of claim 1, wherein the variable optical splitter is configured to adjust the split of the power level in response to an operator input and/or a feedback signal.

3. The multi-channel optical communication system of claim 1, wherein the variable optical splitter further includes:
   - a phase-division multiplexer.

4. The multi-channel optical communication system of claim 1, wherein, for each optical modulator, driver circuitry is configured to generate a swing voltage level difference between a first electrical-domain signal applied across the first modulator arm and a second electrical-domain signal applied across the second modulator arm to cause the signal level difference.

5. The multi-channel optical communication system of claim 1, wherein, for each optical modulator, a first active modulator length of the first modulator arm is different than a second active modulator length of the second modulator arm to contribute to the signal level difference.

6. The multi-channel optical communication system of claim 1, wherein, for each optical modulator, an optical attenuator is disposed on the first modulator arm or the second modulator arm to contribute to the signal level difference.

7. The multi-channel optical communication system of claim 1, wherein the optical combiner is configured to asymmetrically combine the first optical signal portion and the second optical signal portion to combine the first optical signal portion and the second optical signal portion to impart the target chirp.

8. The multi-channel optical communication system of claim 1, wherein the optical combiner is configured to symmetrically combine the first optical signal portion and the second optical signal portion to combine the first optical signal portion and the second optical signal portion to impart the target chirp.

9. The multi-channel optical communication system of claim 1, wherein, for each optical modulator, the signal level difference includes:
   - a respective power level difference; and/or
   - a respective modulation depth difference.

10. The multi-channel optical communication system of claim 1, wherein, for each optical modulator:
    - an output of the optical modulator has a respective wavelength within a respective dispersion power penalty (DPP) valley; and
    - a location of the DPP valley is dependent on the target chirp.

11. A method of modulating multiple optical wavelengths for transmission via a single optical fiber, the method including:
    - for each optical wavelength
      - splitting, via a respective variable optical splitter disposed on a photonic substrate, a respective input optical signal at a respective wavelength into a first optical signal portion at a first input signal level and a second optical signal portion at a second input signal level that is different from the first input signal level, the respective variable optical splitter having i) a first splitter arm ii) a second splitter arm, and iii) only one variable phase modulator, the first splitter arm including the variable phase modulator, wherein splitting the respective input optical signal comprises using the variable phase modulator to control the split of the respective input optical signal at the respective wavelength into the first optical signal portion at the first input signal level and the second optical signal portion at the second input signal level, modulating, via a respective first modulator arm disposed on the photonic substrate, the first optical signal portion of the respective input optical signal;

modulating, via a respective second modulator arm disposed on the photonic substrate, the second optical signal portion of the respective input optical signal, and combining, via a respective optical combiner disposed on the photonic substrate, the first optical signal portion and the second optical signal portion to impart a respective target chirp onto a respective recombined optical signal, the target chirp being based on a signal level difference between a first output signal level of the first optical signal portion and a second output signal level of the second optical signal portion, wherein the signal level difference is determined at least in part by an imbalance of signal intensity between the first modulator arm and the second modulator arm, wherein the imbalance of signal intensity is controlled to cause the target chirp; and multiplexing, via a wavelength-division multiplexer, the recombined optical signals for transmission via the single optical fiber, where the optical fiber is configured to carry multiple optical channels.

12. The method of optical modulation of claim 11, wherein combining the first optical signal portion at the first output signal level and the second optical signal portion at the second output signal level includes asymmetrically combining the first optical signal portion and the second optical signal portion to impart the target chirp.

13. The method of optical modulation of claim 11, wherein combining the first optical signal portion at the first output signal level and the second optical signal portion at the second output signal level includes symmetrically combining the first optical signal portion and the second optical signal portion to impart the target chirp.

14. The method of optical modulation of claim 11, wherein the respective signal level difference includes:

a respective power level difference; and/or a respective modulation depth level difference.

15. The method of optical modulation of claim 11, wherein:

imparting the respective target chirp includes shifting a respective dispersion power penalty valley of the optical fiber in accord with the target chirp.

16. The method of optical modulation of claim 11, wherein for each optical wavelength, splitting the respective input optical signal at the respective wavelength into the first optical signal portion and the second optical signal portion comprises:

using a phase-division multiplexer of the variable optical spitter, the phase-division multiplexer configured to split the respective input optical signal at the respective wavelength into the first optical signal portion at the first input signal level and the second optical signal portion at the second input signal level.

17. A method of manufacturing a multiple-channel optical modulation system, the method including:

fabricating a plurality of optical modulators on a photonic substrate, including for each optical modulator:

fabricating a variable optical splitter on the photonic substrate, including fabricating i) a first splitter arm, ii) fabricating a second splitter arm, and iii) fabricating only one variable phase modulator, wherein fabricating the variable optical splitter includes fabricating the variable optical splitter so that the first splitter arm includes the variable optical splitter, wherein the variable optical splitter is configured to split a respective input optical signal at a respective wavelength into a first optical signal portion at a first input signal level and a second optical signal portion at a second input signal level that is different from the first input signal level, and wherein the variable phase modulator is configured to control the split of the respective input optical signal at the respective wavelength into the first optical signal portion at the first input signal level and the second optical signal portion at the second input signal level;

fabricating a first modulator arm on the photonic substrate and coupled to the variable optical splitter to receive the first optical signal portion, the first modulator arm configured to modulate the first optical signal portion of the respective input optical signal;

fabricating a second modulator arm on the photonic substrate and coupled to the variable optical splitter to receive the second optical signal portion, the second modulator arm configured to modulate the second optical signal portion of the respective input optical signal; and fabricating, on the photonic substrate, an optical combiner configured combine the first optical signal portion and the second optical signal portion to impart a respective target chirp onto a respective recombined optical signal based on the signal level difference between a first output signal level of the first optical portion and a second output signal level of the second optical portion, wherein the signal level difference is determined at least in part by an imbalance of signal intensity between the first modulator arm and the second modulator arm, wherein the imbalance of signal intensity is controlled to cause the target chirp; and fabricating a wavelength-division multiplexer on the photonic substrate, the wavelength-division multiplexer configured to multiplex outputs of the plurality of optical modulators for transmission via an optical fiber.

18. The method of manufacturing of claim 17, wherein for each optical modulator, fabricating the variable optical splitter further comprises:

fabricating a phase-division multiplexer to of the variable optical spitter, the phase-division multiplexer configured to split the respective input optical signal at the respective wavelength into the first optical signal portion at the first input signal level and the second optical signal portion at the second input signal level.

* * * * *